United States Patent [19]
Pentecost

[11] Patent Number: 5,519,267
[45] Date of Patent: May 21, 1996

[54] ENERGY SAVING ELECTROMOTIVE ENGINE

[76] Inventor: J. R. Pentecost, 2344 Kinnys Rd., Cedar Hill, Tenn. 37032

[21] Appl. No.: 249,768

[22] Filed: May 26, 1994

[51] Int. Cl.$^6$ .......................... H02K 33/12; F03B 13/06
[52] U.S. Cl. .................. 310/17; 290/54; 60/371; 60/375
[58] Field of Search ................. 310/17, 20, 21, 310/28, 29, 32; 60/371, 375, 381, 659; 290/52, 54

[56] References Cited

U.S. PATENT DOCUMENTS

| 286,873 | 10/1983 | Van Choate | 310/46 |
|---|---|---|---|
| 722,042 | 3/1903 | Aguirre | 310/154 |
| 1,928,872 | 10/1933 | Sherwin | 310/46 |
| 1,963,213 | 6/1934 | Poysa | 310/46 |
| 2,436,683 | 2/1948 | Wood, Jr. | 290/52 |
| 3,353,028 | 11/1967 | Braikevitch et al. | 290/52 |
| 3,487,228 | 12/1969 | Kriegel | 290/52 |
| 3,492,819 | 2/1970 | Waltrip | 60/486 |
| 3,597,621 | 8/1971 | Yamada | 290/2 |
| 3,677,008 | 7/1972 | Koutz | 60/650 |
| 3,791,771 | 2/1974 | Roesel, Jr. | 417/418 |
| 3,801,793 | 4/1974 | Goebel | 290/2 |
| 3,939,356 | 2/1976 | Loane | 290/92 |
| 4,208,592 | 6/1980 | Liebow et al. | 290/52 |
| 4,237,395 | 12/1980 | Loudermilk | 310/113 |
| 4,243,892 | 1/1981 | Andersson et al. | 290/1 R |
| 4,309,621 | 1/1982 | Litz | 290/52 |
| 4,487,603 | 12/1984 | Harris | 604/152 |
| 4,520,273 | 5/1985 | Rowe | 290/54 |
| 4,809,510 | 3/1989 | Gaspard et al. | 290/52 X |
| 4,873,450 | 10/1989 | Quaintance | 290/52 |
| 5,057,724 | 10/1991 | Patton | 310/17 |

FOREIGN PATENT DOCUMENTS 3941847  6/1991  Germany ................. 310/20

Primary Examiner—Thomas M. Dougherty
Assistant Examiner—Judson H. Jones
Attorney, Agent, or Firm—Kenyon & Kenyon

[57] ABSTRACT

An energy saving electromagnetic motor in which a pressure tank provides pressurized fluid to a turbine, rotating the turbine and a crankshaft. The crankshaft is connected via a clutch and axle to a skin comprising a plurality of magnets, which thus revolve about the axle. The magnet's revolution causes electromagnets to operate piston-driven pumps, which serve to partially replenish the pressure lost by the pressurized fluid after the fluid rotates the turbine.

13 Claims, 4 Drawing Sheets

ENERGY SAVING ELECTROMOTIVE ENGINE

BACKGROUND OF THE INVENTION

The present invention relates to electromotive engines and more particularly to an engine that can operate for extended periods of time after an initial charge by a battery or after an initial charge of pressurized fluid.

Various engines have used pressurized fluids to store energy, which is typically used as needed for later consumption. For example, U.S. Pat. Nos. 3,939,356, 3,677,008, 3,597,621, and 3,801,793 all describe engines which, to some extent, incorporate the use of pressurized fluids to store energy for later consumption during peak periods of use.

The field of motors is replete with many different examples of pumps and magnets, each attempting to find the most efficient design which delivers the most cumulative power over time for the least amount of initial energy. The initial energy may be, for example, from a battery or from a pre-pressurized liquid. Other motors have used compressed air for more continuous generation of electricity, as seen in U.S. Pat. No. 4,208,592, 3,487,228 and 4,873,450. All of the above motors, to some extent, are capable of operating for extended periods of time on a single initial charge.

All of the above systems have similar drawbacks. In particular, the design which coordinates the turbine and the relevant pumps are not as efficient as possible. Moreover, the energy expended in the turbine is not effectively recycled. There is a need for a system with an advanced pump design and magnet configuration to more efficiently run the engine and recycle the expended energy. There is also a need for a system which can be used to provide both mechanical energy as well as electrical energy.

SUMMARY OF THE INVENTION

These and other needs are satisfied by the energy saving electromotive engine of the present invention. The electromotive engine includes a fluid-driven turbine to convert the compressed fluid into mechanical energy when the engine is operated as a motor. The fluid is sent from a pressure tank to the turbine via a first pipe. A fourth pipe takes the fluid to a reserve tank, which then recirculates the fluid through a pumping system via second and third pipes to increase the pressure in the fluid. The pumping system generally includes at least one pistondriven pump. In another embodiment, the reserve tank is eliminated and the fluid may go directly to the pumps before completing the cycle in the pressure tank.

In one embodiment, permanent magnets may lie approximately flat against the circumference of an annular skin. Within the circumference of the skirt but not rotating with it, separate internal coils may generate current as the permanent magnets revolve about them. By tapping this current, the present invention may be used as a generator. Alternatively, this current may be used to help power electromagnets which interact with the permanent magnets. The internal coils may be connected in parallel or in series.

In the embodiment, permanent flat magnets are located around the periphery of a skirt depending annularly from a base wall. The base wall rotates about an axle. The axle may be connected via a clutch to the turbine.

Electromagnets are located around the exterior of the skirt and may pivot about an axis. These electromagnets are powered by a points and cam system which serves to alternate the voltage applied such that the polarity of the electromagnets reverses cyclically. This effect alternately attracts and repels the permanent flat magnets, continuing the motion of the engine.

The interaction of the permanent flat magnets with the electromagnets is also used to operate pumps located at fixed positions around the circumference of the system. In this capacity, the electromagnets pivot back and forth between two extreme positions, a single direction and an opposite of this direction, as their voltage is alternated cyclically. The pivoting motion is translated to a pump rod which operates a piston-driven pump. This helps to pump the working fluid pressure to a reasonable working value, but obviously less than that achieved in the initial charge. This system has enhanced efficiency and can operate for extended periods of time.

DETAILED DESCRIPTION

The Fluid Flow Layout

Figure 1:
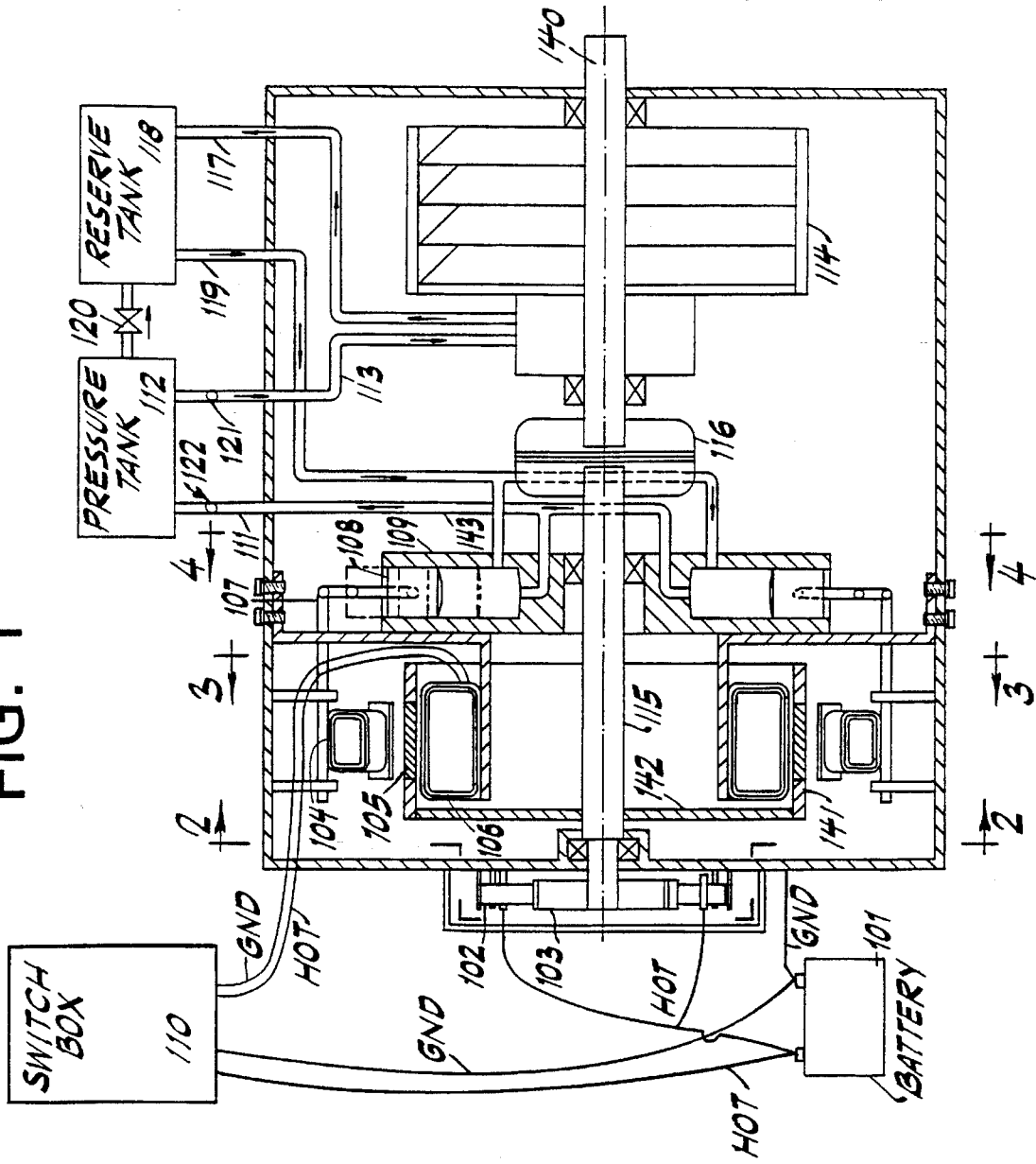
FIG. 1 shows a side section of the overall configuration of an embodiment of the present invention.

FIG. 1 is a schematic diagram of an embodiment of the system of the present invention. A pressure tank 112 holds a working fluid, which may be any fluid capable of being pumped. Pressure tank 112 can include any type of tank capable of holding a pressurized fluid. The working fluid exits the pressure tank 112 by way of a first pipe 113, which may be controlled by a first one-way valve 121. First pipe 113, which may include any type of pipe capable of handling the pressure of the working fluid, leads to a fluid-driven turbine 114. The working fluid, which is under pressure, flows against the blades of the turbine 114 making the blades of the turbine 114 rotate. The axis of turbine 114 is a crankshaft 140 which connects the turbine 114 to a clutch 116, which may be a slip clutch or a standard clutch. The clutch 116 serves to control the speed of the engine. Clutch 116 also allows the crankshaft 140 to be rotatably connected to an axle 115 at the user's option.

Once the working fluid has exited the pressure tank and been forced against the turbine 114, the same fluid is returned via a fourth pipe 117 to a reserve tank 118, which may include any type of tank capable of holding a pressurized fluid. Fourth pipe 117 may include any type of pipe which is capable of withstanding the pressure of the working fluid. Reserve tank 118 then circulates the working fluid to a pumping system. The pumping system, and particularly a series of pumps 108, serves to replenish some of the pressure the working fluid loses when it expends its energy against the blades of the turbine 114 as well as to replenish some of the losses due to friction from the viscosity of the working fluid. To accomplish this, a second pipe 119 circulates the working fluid from the reserve tank 118 to the pumps 108. The working fluid is returned to the pressure tank 112 via a third pipe 143 through a second one-way valve 122. In this fashion, by returning the working fluid to the pressure tank 112 in a pressurized state, the engine can be made to run for extended periods of time. A relief valve 120 serves to allow the release of excess pressure from pressure tank 112 to reserve tank 118.

The Electrical System

Revolving about axle 115 is base wall 142 and rigid skin 141. A number of permanent magnets 105 are connected to the skirt 141. In the embodiment shown in FIGS. 1–4, the rigid skin contains six flat permanent magnets 105. It is, however, not necessary that the magnets be flat nor that there be six of them. Permanent magnets 105 are held flat against or may form pan of the cylindrical exterior wall of the rigid skin 141 depending annularly from the base wall 142.

Figure 2:
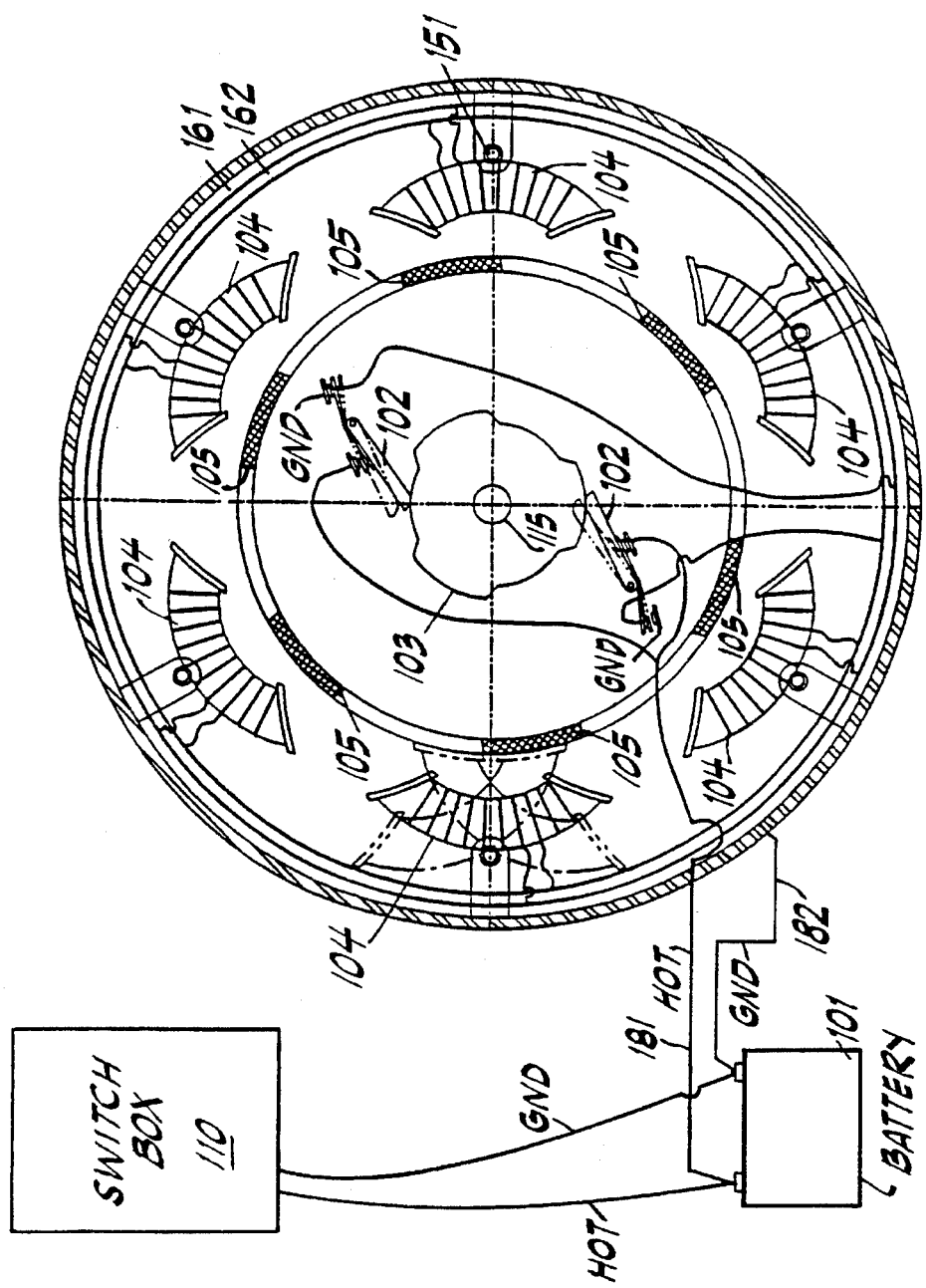
FIG. 2 shows a cross-section of the embodiment, showing a points and cam system.

A series of electromagnets 104 are located around the exterior of the rigid skin 141, as shown in FIG. 2. These electromagnets are powered from a points and cam system in a parallel fashion by first wire 161 and second wire 162 which encircle the electromagnets. The points and cam are described later in regard to starting the engine. The electromagnets 104 serve two functions. The first is to alternately attract and repel the permanent magnets 105. The second is to pivot, in the course of attracting and repelling the permanent magnets, back and forth about pivot point 151. This pivoting motion is translated into a pumping motion by the pump rod 107.

The rotation of the permanent magnets 105 induces current in a set of internal coils 106 because of the motion of the permanent magnets 105 over the top of the internal coils 106.

It should be noted that, in this embodiment, the positioning of the flat magnet 105 may not present a pure north pole or pure south pole to interact with the electromagnets 104 or to the internal coils 106. However, as long as the major components of such fields are sufficient to interact with the electromagnets 104 and operate the pumps 108, the invention is operational.

Figure 3:
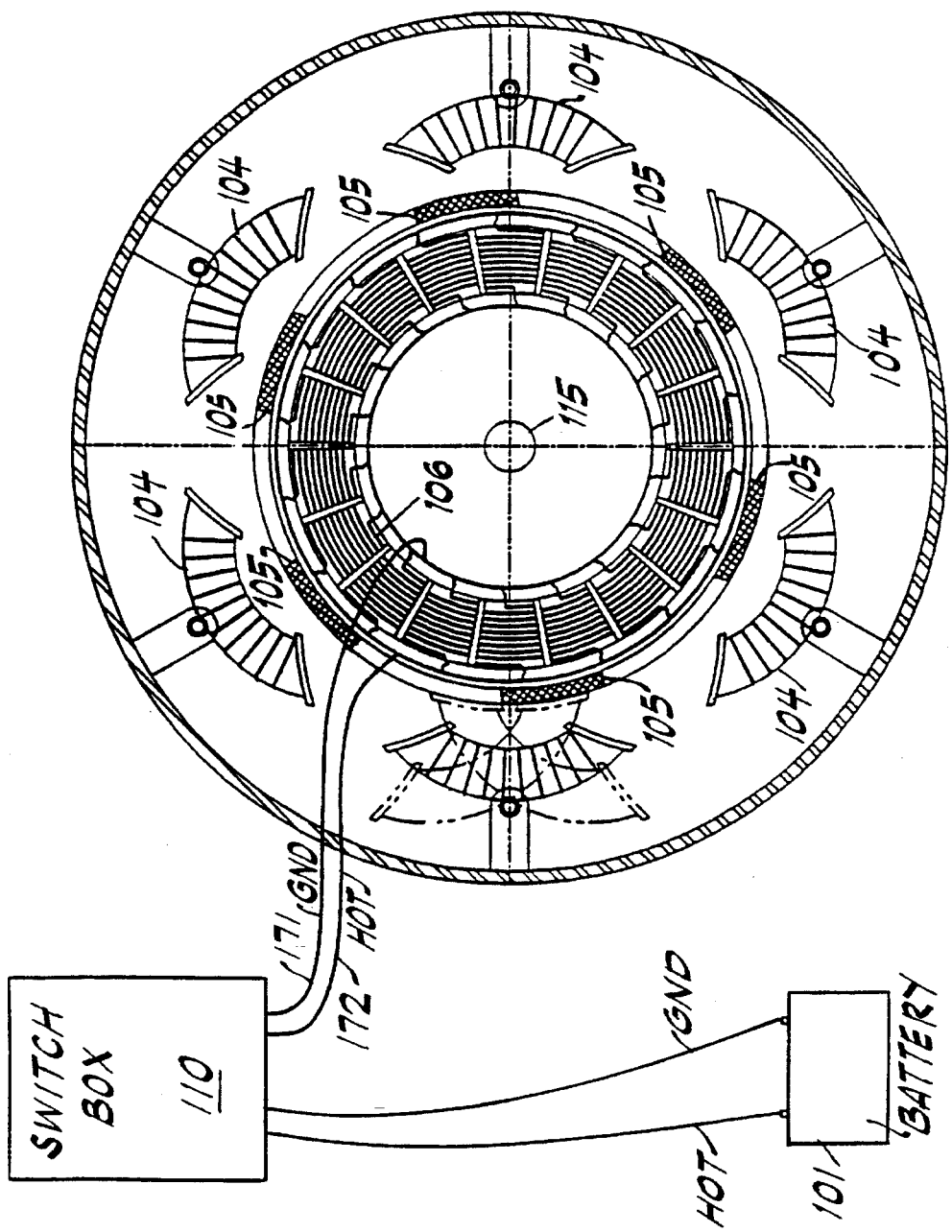
FIG. 3 shows a cross-section of the embodiment, showing internal coils.

FIG. 3 also illustrates the use of the invention as a generator. For this use, unlike the previous use as a motor, there may be little or no load placed on the crankshaft. Internal coils 106, as described above, generate electricity as permanent magnets 105 revolve about the distal ends of coils 106. Coils 106 may be wired together in series or in parallel, depending on the user's needs. If there is a need for low current but high voltage, the coils may be wired in series. In such a configuration, a typical voltage may be 10 volts/coil at about 0.5 amps. Alternatively, if the coils are wired in parallel, one may achieve a total voltage of about 12 volts and a current of 15–20 amps. FIG. 3 shows this latter configuration. In either case, a third and fourth wire, 171 and 172 respectively, emerge from the internal coils and are sent to the switch box 110. These wires may then be sent to the battery to help replenish its charge. Alternatively, the wires may go to the points system to help power the electromagnets. In another embodiment, some of the voltage and current may be removed from the switchbox 110 to power an exterior electric device. In practice, the wires 171 and 172 would be sent to a transformer which could power an electrical outlet located near the invention. Depending on the circuitry employed, both alternating current and direct current could be provided.

The Pumping System

Figure 4:
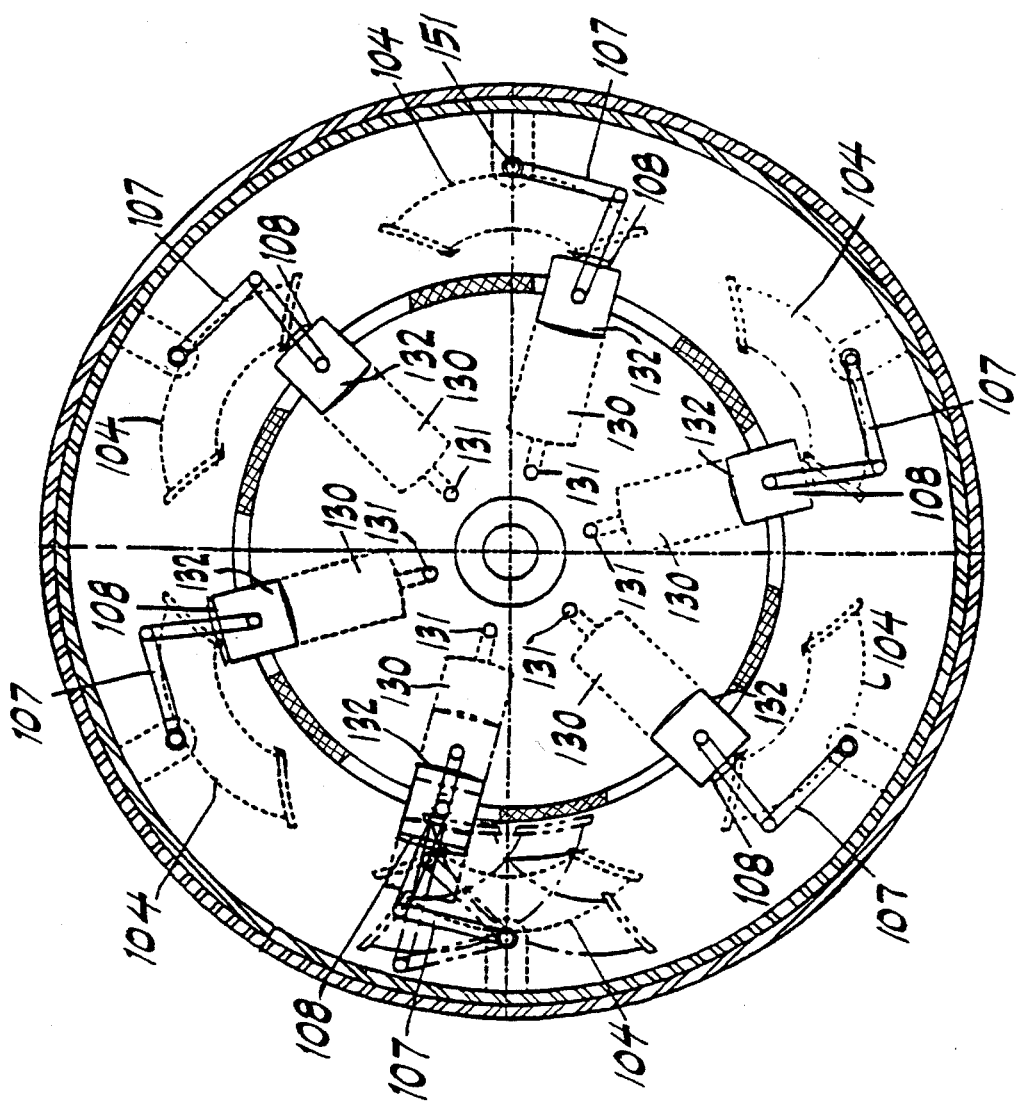
FIG. 4 shows a cross-section of the embodiment, showing a pumping system.

The pump 108 is of simple design. FIG. 4 shows how, as a pump rod 107 moves, a partial vacuum is created in a pump head 130. The partial vacuum, as well as the residual pressure of the fluid following the fluid's exit from the turbine, draws the working fluid into the pump head 130 above a piston 132. A one-way valve (not shown) at the inlet to the pump head 130 ensures that no fluid will flow in the reverse direction back towards the turbine 114. When the action of the electromagnet 104 forces the pump rod 107 and piston 132 in the opposite direction, the increased pressure forces the working fluid out of the outlet side of the pump head 130. The outlet side is similarly equipped with a one-way valve (not shown) to ensure that no working fluid is returned to the pump head 130 once it leaves the outlet of the pump head 130 and enters third pipe 143.

The force from the interaction of the flat permanent magnet 105 and electromagnet 104 thus causes the pumping action. As the end of one of the electromagnets 104 attracts a permanent magnet 105, the electromagnet 104 pivots about pivot point 151 to an extreme position. A typical stroke distance for this action may be approximately one and a half inches. This forces pump rod 107 to an extreme position, which may result in the piston being forced most of the way into the pump or out of the pump. Typically, pump rod 107 may have an approximately 2 inch stroke.

When the points/cam system changes the polarity of the electromagnet 104, causing the electromagnets 104 to repel the permanent magnets 105, the repulsion forces the electromagnet 104 to the opposite extreme in its pivotal motion. This action is transmitted to pump 108 through pump rod 107, forcing the pump rod to the opposite extreme of its stroke, completing a cycle in the pumping action. The continued motion, as each permanent magnet is alternately attracted and repelled, and thus each electromagnet pivots between two extremes, causes an effective pumping action to help replenish the pressure in the working fluid. This action is implied in the leftmost electromagnet of FIG. 4. The other electromagnets' motions are not shown for clarity.

Starting the Engine

The action of the engine may be started by the use of a battery 101 or by the pressure tank 112 which has been pre-pressurized. Starting the engine from the battery 101 will be described first.

If a battery 101 is inserted in the system, as shown in FIG. 2, the hot wire 181 and ground wire 182 from battery 101 are coupled to a points system 102. Points system 102 makes physical contact with a cam 103. Cam 103 is concentric with and rotates with crankshaft 107, making the points 102 alternately rise away and fall towards the crankshaft 107. The points 102 are connected to first wire 161 and second wire 162 which provide a voltage to the electromagnets 104. It can be noted from FIG. 2 that the electromagnets 104 are connected in parallel so that each electromagnet 104, all of which are substantially identical, has the same magnetic field strength and polarity induced by its coil. The determination of which end of the electromagnets 104 are north poles depends on the polarity of the voltage and the direction of the turns in the electromagnets 104.

When a battery is applied, the electromagnets form magnetic poles at their extremities. The electromagnets 104 then attract the permanent flat magnets 105, causing the rotation of the skin 141. This attraction pivots the electromagnets 104 about their pivot point 151, as is shown in FIG. 2, causing the first action in the pumping cycle. To assist the movement of the permanent magnets 105, the axle 115 may be decoupled from the turbine 114 using clutch 116 so as to allow the skirt 141 to achieve an operating speed unhindered by the moment of inertia of the turbine 114. Once the skin has rotated under the attraction of the electromagnets 104, its angular momentum helps to continue its motion. At this point, the points system changes the polarity of the coils so that the opposite side of the electromagnetic coil 104 has the same polarity that the first side originally had. This causes the same attraction which occurred above, and results in the continued pull of the electromagnet 104 on the permanent magnet 105. This continues the rotation of the skin. The cycle then is repeated. A typical speed of rotation in such a system may be on the order of 200–400 rpm, or about half the speed of an ordinary generator. This speed is low enough that no special cooling system is necessary. It is also low enough that the inductance of the electromagnets does not lead to arcing or other heating losses.

After the skin has achieved a reasonable operating speed, the turbine 114 may then be clutched in using clutch 116.

The above battery may furthermore be replaced by an alternating current source with an appropriate rectifying circuit.

Starting the engine from the pressure tank 112 is described next. The pressure tank 112 may be valved off of the system using the one-way valves 121 and 122. If the pressure tank 112 is then pressurized with a positive head of pressure, then opening valve 121 initiates a rotational motion in the turbine 114. In this case, the turbine 114 would already be clutched in with the axle 115. As a result, the permanent magnets 105 on skirt 141 also rotate with the turbine 114. The rotation of the permanent magnets induces current in the internal coils, which then help to power the electromagnets. The powered electromagnets then operate the pumping system.

A third method of starting the engine would be to manually turn the crankshaft 140 while it was clutched in to the axle 115. Alternatively, the axle 115 may be rotated manually. In either case, this serves to start the pumps 108 through the interaction of the permanent magnets 105 and the electromagnets 104 as described above. The motion of the pumps 108 again causes the working fluid to be pressurized, thus continuing the motion of the engine.

Conclusion

The present invention is able to operate for long periods of time because of the aggregation of four different forces which assist the motion. The first force arises from the fluid pressure causing the rotation of the fluid-driven turbine. The second force arises from the attraction of the permanent magnets to the electromagnets. The third force arises from the repulsion of the permanent magnets and the electromagnets once the polarity of the electromagnets is reversed by the electrical system. The fourth force arises from the efforts of the pumps to increase the fluid pressure.

It is clear that this invention is not limited to this configuration of magnets. Any similar configuration of magnets, with an appropriate timing sequence defined by the firing head/points system, can work to run the pumps to pressurize the pressure tank.

Note that the above embodiment is meant to be illustrative and not limiting of the device of the present invention. Any magnet type could be used which possesses sufficient strength to interact efficiently with the electromagnets 104 so as to operate pumps 108. Further embodiments could even include replacing the permanent flat magnets with electromagnets that are powered by a battery or other source. Power could even be removed from the points/cam system to power these electromagnets.

The invention describes a motor which can be used to provide mechanical and electrical energy. The motor of the present invention uses pressurized fluid to turn a set of permanent magnets. The magnets' rotation operates pumps which replenish some of the pressure the fluid loses in rotating the magnets. This system allows the motor to operate efficiently for extended periods of time.

What is claimed is:

1. An energy-saving electromagnetic motor, comprising:

a pressure tank for holding pressurized fluid in a pressurized state;

a fluid-driven turbine coupled to said pressure tank, said pressurized fluid driving said fluid-driven turbine, said fluid-driven turbine revolving about a crankshaft;

a first pipe coupled between said turbine and said pressure tank for directing said pressurized fluid from said tank to said fluid-driven turbine;

at least one piston-driven pump coupled between a reserve tank and said pressure tank, said piston-driven pump increasing the pressure of said pressurized fluid;

a second pipe coupled between said reserve tank and said piston-driven pump, said second pipe directing the pressurized fluid from said reserve tank to said piston-driven pump;

a third pipe coupled between said piston-driven pump and said pressure tank, said third pipe directing said pressurized fluid from said piston-driven pump to said pressure tank;

a fourth pipe coupled between said turbine and said reserve tank for directing said pressurized fluid from said turbine to said reserve tank; and a skin revolving about an axle, said axle connected to said crankshaft, said skirt comprising a magnet, said magnet revolving with said skin to within a distance of an electromagnet, such that said magnet interacts with a magnetic field of said electromagnet;

wherein the magnetic field of said magnet produces a force on each electromagnet so as to pull a piston of said piston-driven pump in a single direction, an electrical system inducing a current in said electromagnets so as to pull said piston opposite of said single direction in such a way as to operate said piston-driven pump.

2. The energy-saving electromagnetic motor of claim 1, wherein said magnet is a permanent magnet.

3. The energy-saving electromagnetic motor of claim 1, wherein said magnet is substantially flat.

4. The energy-saving electromagnetic motor of claim 1, wherein said magnet is an electromagnet.

5. The energy-saving electromagnetic motor of claim 1, further comprising:

an internal coil, said internal coil having electricity generated within said internal coil when said magnet revolves about said internal coil.

6. The energy-saving electromagnetic motor of claim 5 wherein said internal coil is capable of powering an electrical device.

7. The energy-saving electromagnetic motor of claim 1 wherein a plurality of said internal coils are connected in parallel.

8. The energy-saving electromagnetic motor of claim 1, further comprising:

a clutch connecting said crankshaft and an axle;

such that said clutch is capable of controlling a speed of rotation of said axle.

9. The energy-saving electromagnetic motor of claim 5 wherein said internal coil is capable of powering said electromagnet.

10. The energy-saving electromagnetic motor of claim 5 wherein a plurality of said internal coils are connected in series.

11. The energy-saving electromagnetic motor of claim 1, further comprising a clutch coupled between said crankshaft and said axle.

12. The energy-saving electromagnetic motor of claim 1, wherein said electrical system comprises:

a cam rotatably coupled to said axle, and a plurality of points electrically coupled to said cam, said points opening and closing as said cam rotates so as to alternately provide positive and negative voltages to said electromagnet.

13. The energy-saving electromagnetic motor of claim 1, wherein said pressure tank and said reserve tank are the same tank.

* * * * *

UNITED STATES PATENT AND TRADEMARK OFFICE
CERTIFICATE OF CORRECTION

PATENT NO. : 5,519,267  
DATED : 21 May 1996  
INVENTOR(S) : J.R. PENTECOST

It is certified that error appears in the above-identified patent and that said Letters Patent is hereby corrected as shown below:

IN THE ABSTRACT, line 4: Change "skin" to --skirt--.

| Column | Line | |
|---|---|---|
| 1 | 48 | Change "postondriven" to --piston-driven--. |
| 1 | 52 | Change "skin" to --skirt--. |
| 3 | 5 | Change "skin" to --skirt--. |
| 3 | 8 | Change "skin" to --skirt--. |
| 3 | 12 | Change "skin" to --skirt--. |
| 3 | 14 | Change "skin" to --skirt--. |
| 4 | 57 | Change "skin" to --skirt--. |
| 4 | 63 | Change "skin" to --skirt--. |

UNITED STATES PATENT AND TRADEMARK OFFICE
CERTIFICATE OF CORRECTION

PATENT NO. : 5,519,267
DATED : 21 May 1996
INVENTOR(S) : J.R. PENTECOST

It is certified that error appears in the above-identified patent and that said Letters Patent is hereby corrected as shown below:

| Column | Line | |
|---|---|---|
| 5 | 4 | Change "skin" to --skirt--. |
| 5 | 11 | Change "skin" to --skirt--. |
| 6 | 28 | Change "skin" to --skirt--. |
| 6 | 30 | Change "skin" to --skirt--. |

Signed and Sealed this

Twenty-fourth Day of September, 1996

Attest:

BRUCE LEHMAN

*Attesting Officer*     *Commissioner of Patents and Trademarks*